(12) United States Patent
Yeo et al.

(10) Patent No.: US 11,637,959 B2
(45) Date of Patent: Apr. 25, 2023

(54) ORBITAL CAMERA SYSTEM

(71) Applicant: MARBL LLC, Scottsdale, AZ (US)

(72) Inventors: Joshua C. Yeo, Los Angeles, CA (US);
Jonathan Hyams, Scottsdale, AZ (US)

(73) Assignee: MARBL LLC, Scottsdale, AZ (US)

( * ) Notice: Subject to any disclaimer, the term of this patent is extended or adjusted under 35 U.S.C. 154(b) by 0 days.

(21) Appl. No.: 17/762,079

(22) PCT Filed: Apr. 9, 2021

(86) PCT No.: PCT/US2021/026565
§ 371 (c)(1),
(2) Date: Mar. 20, 2022

(87) PCT Pub. No.: WO2021/207591
PCT Pub. Date: Oct. 14, 2021

(65) Prior Publication Data
US 2022/0368836 A1    Nov. 17, 2022

Related U.S. Application Data

(60) Provisional application No. 63/007,667, filed on Apr. 9, 2020.

(51) Int. Cl.
*H04N 5/232* (2006.01)
*H04N 5/225* (2006.01)

(52) U.S. Cl.
CPC ....... *H04N 5/23299* (2018.08); *H04N 5/2253* (2013.01); *H04N 5/2256* (2013.01); *H04N 5/23203* (2013.01)

(58) Field of Classification Search
CPC .... F16M 11/26; F16M 11/2014; F16M 11/10; F16M 11/14; F16M 11/18; F16M 11/28; F16M 11/2092; F16M 11/2021; F16M 11/2085; F16M 13/027; H04N 5/23203; H04N 5/23299; H04N 5/2253; H04N 5/2256; G03B 17/561
USPC ....................................................... 348/211.2
See application file for complete search history.

(56) References Cited

U.S. PATENT DOCUMENTS

| | | | |
|---|---|---|---|
| 4,340,971 A | 7/1982 | Furuichi et al. | |
| 4,365,340 A | 12/1982 | Nishikawa et al. | |
| 5,428,660 A | 6/1995 | Daniel, Jr. | |
| 5,531,412 A * | 7/1996 | Ho | F16M 11/2092 396/428 |

(Continued)

*Primary Examiner* — Pritham D Prabhakher
(74) *Attorney, Agent, or Firm* — Invention To Patent Services; Alex Hobson

(57) ABSTRACT

An orbital camera system has at least two extensions that extend from a hub to rotate a camera about a hub in a balanced and low vibration manner. In addition, the exemplary orbital camera system is versatile in configuration having extensions with hinges to allow variations in the configuration. The hub may be powered by a motor that provides smooth rotation even at low speeds. The hub is coupled to a down rod and the motor may be detachably attached to the down rod. A counterweight may be a battery or a battery station that enables detachable attachment of a battery thereto. An illumination light is coupled to the hub to provide uniform light over the imaging area. A focal element and/or a centering light emitter may be configured along the rotational axis for aid in placing an object to be imaged.

23 Claims, 12 Drawing Sheets

(56) References Cited

U.S. PATENT DOCUMENTS

| | | | | |
|---|---|---|---|---|
| 6,752,541 | B1* | 6/2004 | Dykyj | B66F 11/048 |
| | | | | 248/176.1 |
| 9,851,046 | B2* | 12/2017 | Pan | F16M 11/12 |
| 9,921,459 | B2* | 3/2018 | Wagner | F16M 13/04 |
| 10,139,042 | B2* | 11/2018 | Hashiguchi | F16M 11/046 |
| 10,208,887 | B2* | 2/2019 | Tian | F16M 11/123 |
| 10,642,130 | B2* | 5/2020 | Niemeyer | G03B 17/561 |
| 11,042,078 | B2* | 6/2021 | Wagner | G02B 27/646 |
| 11,438,492 | B2* | 9/2022 | Zhang | G06T 7/557 |
| 2006/0110155 | A1 | 5/2006 | Kouchi et al. | |
| 2007/0019947 | A1 | 1/2007 | Shimada | |
| 2012/0099851 | A1* | 4/2012 | Brown | F16M 11/18 |
| | | | | 396/421 |
| 2013/0209085 | A1* | 8/2013 | Wood | F16M 11/24 |
| | | | | 396/428 |
| 2015/0281525 | A1* | 10/2015 | Thakur | H04N 5/2251 |
| | | | | 348/376 |
| 2016/0195798 | A1* | 7/2016 | Nenov | F16M 11/14 |
| | | | | 396/421 |
| 2016/0246162 | A1* | 8/2016 | Niemeyer | F16M 11/18 |
| 2017/0159875 | A1* | 6/2017 | Wagner | G03B 17/563 |
| 2018/0031952 | A1* | 2/2018 | Niemeyer | F16M 11/18 |
| 2018/0040209 | A1* | 2/2018 | Lim | G08B 5/22 |
| 2018/0335178 | A1* | 11/2018 | Bin | F16M 11/38 |
| 2019/0246038 | A1* | 8/2019 | Kim | H04N 5/23245 |
| 2019/0339597 | A1* | 11/2019 | Wagner | F16M 11/18 |

* cited by examiner

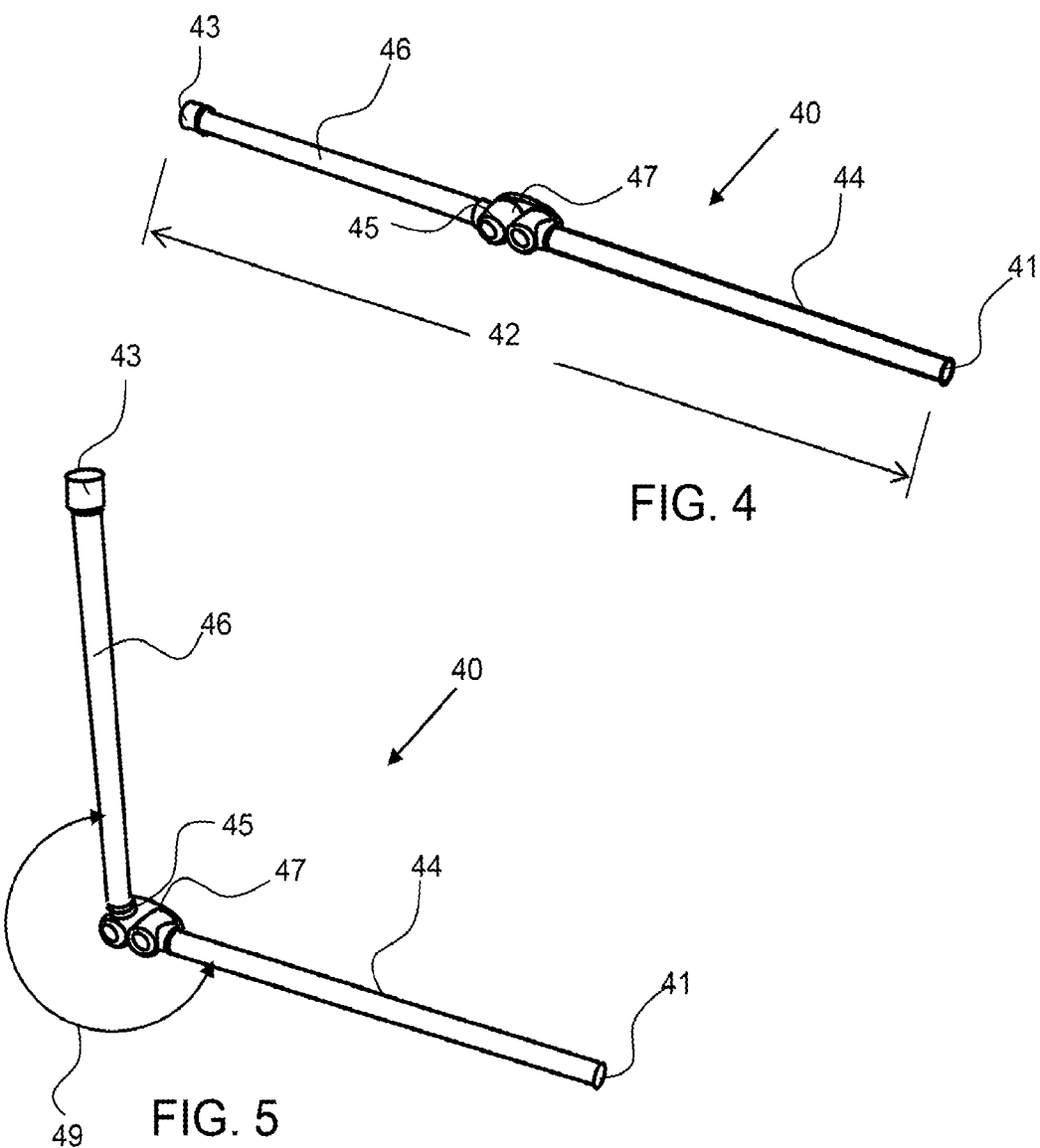
FIG. 4
FIG. 5
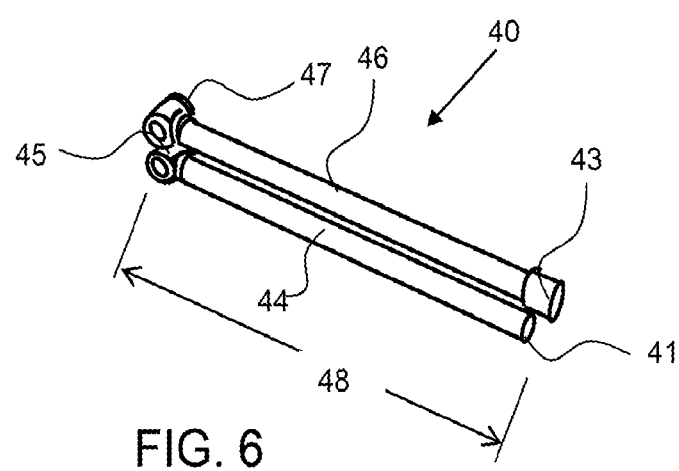
FIG. 6

ORBITAL CAMERA SYSTEM

CROSS REFERENCE TO RELATED APPLICATIONS

This application claims the benefit of priority to U.S. provisional patent application No. 63/007,667, filed on Apr. 9, 2020; the entirety of which is hereby incorporated by reference herein.

BACKGROUND OF THE INVENTION

Field of the Invention

The invention relates to an orbital camera system that is configured to be configured above an object to be imaged by a camera coupled to an extension that rotates about a rotation axis of the hub and a method of imaging an object using the orbital camera system.

Background

Existing orbital camera systems are typically fixed mounted systems that provide little versatility. In addition, many orbital camera systems are not balanced and therefore produce vibration during the rotation of the camera.

SUMMARY OF THE INVENTION

The invention is directed to an orbital camera system that is configured to be configured above an object to be imaged by a camera coupled to an extension that rotates about a rotation axis of the hub and a method of imaging an object using the orbital camera system. An exemplary orbital camera system is collapsible for temporary mounting above an object to be imaged, such as to a ceiling via a down rod coupled to a mount, or to a mount stand having a stand extension for mounting. The orbital camera system has a first extension that is coupled to the hub and is configured to rotate a camera about a hub in a balanced and low vibration manner. The hub is driven by a motor which may be coupled to the hub via gearing or may be directly driven by the motor, such as being coupled directly to a drive shaft of the motor. In addition, the exemplary orbital camera system is versatile in configuration having extensions with hinges to allow variations in the configuration. For example, a distal segment having a camera attached thereto, may be rotated about the hinge to a desired location and the opposing extension, which may have a counterweight, may be rotated about its respective extension to provide a balanced configuration about the hub.

The orbital camera system may be configured with features to enable focusing the camera on an object prior to beginning imaging. A focal hub attachment may be configured on the hub to allow attachment of a focal element thereto. The focal element may be coupled with a focal tether that hangs down from the focal hub attachment. A focal element attachment may be coupled to the focal tether and configured to detachably attach to the focal hub attachment. The focal hub attachment may be a threaded attachment for receiving a corresponding threaded attachment of the focal element attachment. The focal tether may be adjustable in length to enable positioning of the focal element in a desired location along the rotation axis. A camera may be coupled to one or both of the extension and then focused on the focal element. The focal element may then be detached from the focal hub attachment and an object may be placed where the focal hub attachment was positioned and imaging of the object may commence.

The orbital camera system may also have a centering light emitter that is configured along the rotation axis and configured to emit a light down along the rotation axis, such as a light beam or a laser light beam. Using the light or light beam from emitted by the centering light emitter, an object to be imaged may be positioned along the rotation axis, wherein the centering light is positioned on a desired location of the object. The centering light emitter and focal hub attachment may be configured on the hub or a hub bracket or extension and may be aligned with the rotation axis.

The orbital camera system may be configured with an illumination light to illuminate an object and this light may be configured around the rotational axis. One or more lights may be positioned about the rotation axis to produce a uniform object illumination light down over an object to be imaged. An exemplary illumination light may be a ring light, extending around a portion of the rotation axis or completely around the rotational axis. A ring light may consist of a single light or may comprise a plurality of lights arranged around the rotation axis; leaving an area about the rotation axis open for the centering light emitter and/or the focal hub attachment. An exemplary illumination light may be detachably attached to the hub and may be a battery powered light, thereby not requiring any wired connection for power during rotation of the hub.

The hub is configured at an extended end of a down rod and is driven by a motor to rotate the hub and components attached thereto, including a first extension, second extension, and illumination light. The motor may be detachably attached to the down rod and the hub and gearing may be configured between the motor and the hub. In an exemplary embodiment, a motor is a direct drive motor and directly drives the hub, wherein the hub is coupled directly to the drive shaft of the motor and wherein one rotation of the drive shaft produces one rotation of the hub. The motor may have a battery pack to provide power to the motor, thereby not requiring any wired connection for the orbital camera system. An exemplary motor may be configured to operate from a very low rotation speed, $1/20$ revolution per minute (rpm), or $1/12$ rpm to higher speed, such as about 1 rpm or more, about 2 rpm or more, about 5 rpm or more, about 10 rpm or more and any range between and including the rotation speeds listed. An exemplary motor may be a servo motor and may be very quiet to prevent background noise during video imaging.

The motor may be detachably attached to the down rod or to the hub and may have a motor-gear that engages with hub-gear to drive the hub and the extension coupled thereto. The motor may be configured above the hub and hub gear and therefore may utilize gravity for engagement with the hub-gear. The motor may be coupled to the down rod by a motor connector, such as a collar.

An exemplary orbital camera system may have a controller that is configured to receive control instruction via a remote controller via a wireless signal. A controller of the orbital camera system may have a wireless transceiver including a wireless signal receiver for receiving control instructions from a remote controller, such a mobile device including a mobile phone, tablet computer, portable or laptop computer and the like. The remote controller may also have a wireless signal transceiver that includes a wireless signal transmitter. The remote controller and controller of the orbital camera system may communicate back and forth or the remote controller may simply provide instructions to the controller of the orbital camera system, thereby requiring a signal transmitter of the remote controller and a signal receiver coupled to the controller of the orbital camera system. In an exemplary embodiment, an App on a mobile phone is configured to communicated with the controller via a short range wireless signal, such as Bluetooth. The App may enable motion control of the system to rotate the extension or extensions. Controlled motion may include control of the speed of rotation as well as direction of rotation and sweep angle. The App may enable a programmed motion that includes one or more motion events, a first motion event may be rotation of the extension in a first direction at a first speed of rotation for a first sweep angle and then a second motion, which may be rotation in a second direction, which may be an opposing direction to the first motion, a second rotational speed and a second sweep angle. Note too that the controller may simply set the rotational speed and direction of rotation. A controller may also change the intensity of the light emitted from the illumination light and the intensity may be changed during a programed motion for enhanced visual effects.

An exemplary orbital camera system has two extensions that extend from the hub in opposing directions to provide a balanced configuration to prevent vibrations. An extension may be detachably attachable to the hub by an extension connector. The proximal ends of the extensions may be inserted or coupled with the extension connector and an extension lock, such as a knob, may secure the extensions to the extension connector. An exemplary extension has a proximal segment that is coupled to distal segment by a hinge that allows the distal segment to rotate about the hinge with respect to the proximal segment. The proximal segment may extend horizontally from the hub, or substantially orthogonal to the down rod and the distal segment may then rotate about the hinge to a desired extension angle. The hinge may allow the distal segment to rotate from 180 degrees, or in alignment with the proximal segment, to about zero or 360 degrees, wherein the distal segment is folded back along the proximal segment. This wide range of rotation allows for the camera to be configured in any desired angular position. Furthermore, the extension can be folded back onto itself to enable a more compact configuration for transport and storage.

An exemplary extension may be a length that enables 360 degree filming or photo capture about a desired location and may be about 25 cm in length or more, about 50 cm in length or more, about 75 cm in length or more, about 1 m in length or more, about 1.5 m in length or more, about 2 m in length or more, about 4 m in length or more, about 6 m in length or more and any range between and including the values provide. The extension length may b chosen depending on the size of the object to be images and the desired imaging.

The hub is configured at the extended end of the down rod and is driven by a motor to rotate the extensions coupled thereto. The extension(s) may be detachably attached to an extension connector that is coupled to the hub. The extension connector may have an extension lock to secure the hub-ends of the two extensions to the extension connector. In an exemplary embodiment, the hub-ends of the extensions are circular in cross-section shape, or are rods or cylinders, and the extension connector has a receiving hole for the insertion of the hub-ends therein. In an exemplary embodiment the extension may be a single extension that extends through a coupling on the hub to extend in opposing direction from the hub. Note that a hub may be configured to receive any number of extensions, however it may be desirable to keep the cantilevered load on the hub balanced, to avoid vibration. For example, two extensions may extend in opposing directions from the hub, or three may extend 120 degrees apart and four extension may extend 90 degrees apart or have two sets of opposing extensions.

A counterweight may be configured on an opposing extension from a camera to provide stability of the extensions and to reduce vibrations. A counterweight may be a battery or battery system may be configured along an extension to provide a balanced load, wherein the torque exerted on the hub by the extensions is substantially balanced. For example, a two extension system wherein the two extension are in alignment may each produce a torque load on the hub that is within about 20% or less of each other and preferably about 10% or less of each other and more preferably within about 5% or less of each other; thereby being substantially balanced. Note that the torque arm, or the distance of the camera or cameras, and/or a counterweight or battery system may be adjusted along the extension to produce a substantially balanced torque on the hub. For example, the battery system may be heavier than the camera and therefore may be slid toward the hub to produce substantially the same torque as a lighter camera configured further away from the hub.

The battery may receive power from a battery configured therewith or from a remote power source, such as an electrical cord coupled with a plug, for example. In an exemplary embodiment, the motor receives power from a battery that is coupled to one of the extensions and this battery may serve as a counterweight. For example, a battery may be configured along a second extension a distance from the hub to counterweight a camera coupled to the first extension. Battery leads may extend along the second extension to the motor and may extend within the second extension. A battery may be detachably attachable to the battery station, thereby enabling quick switch over of a depleted battery with a charged battery. A battery station may enable a battery to couple with the station and connect the battery contacts with station contacts.

A camera, such as a video and/or still picture camera, may be coupled to an extension by a camera-extension coupler, which may enable the camera to slide along an extension to a desired location. A camera-extension lock may then secure the camera-extension in place along the extension. A camera-extension lock may be a knob that produces a clamping force of the camera-extension on the extension. A camera may be configured to be moved in two or more degrees of freedom, such as being rotated horizontally and/or vertically. A horizontal pivot may be coupled to the camera to allow the camera to rotate horizontally and a vertical pivot may be configured to allow the camera to rotate vertically. Each of the pivots may have locks to secure the camera in a desired orientation.

Imaging, as used herein includes still photographs and video capture of an object, such as a physical object or person configured, preferably, within the perimeter of the extensions and typically centrally located along the rotational axis of the orbital camera system below the hub. A camera, as used herein may be a still camera or video camera.

A down rod may be a rod extending from a mount or when a direct drive motor is used, a down rod may comprise the drive shaft from the motor and the motor may be mounted to the mount or a mount stand.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 4 shows a first extension in a straight configuration.

FIG. 5 shows a first extension in a rotated configuration.

FIG. 6 shows a first extension in a folded configuration with the proximal segment folded to be substantially parallel with the distal segment.

Figure 1:
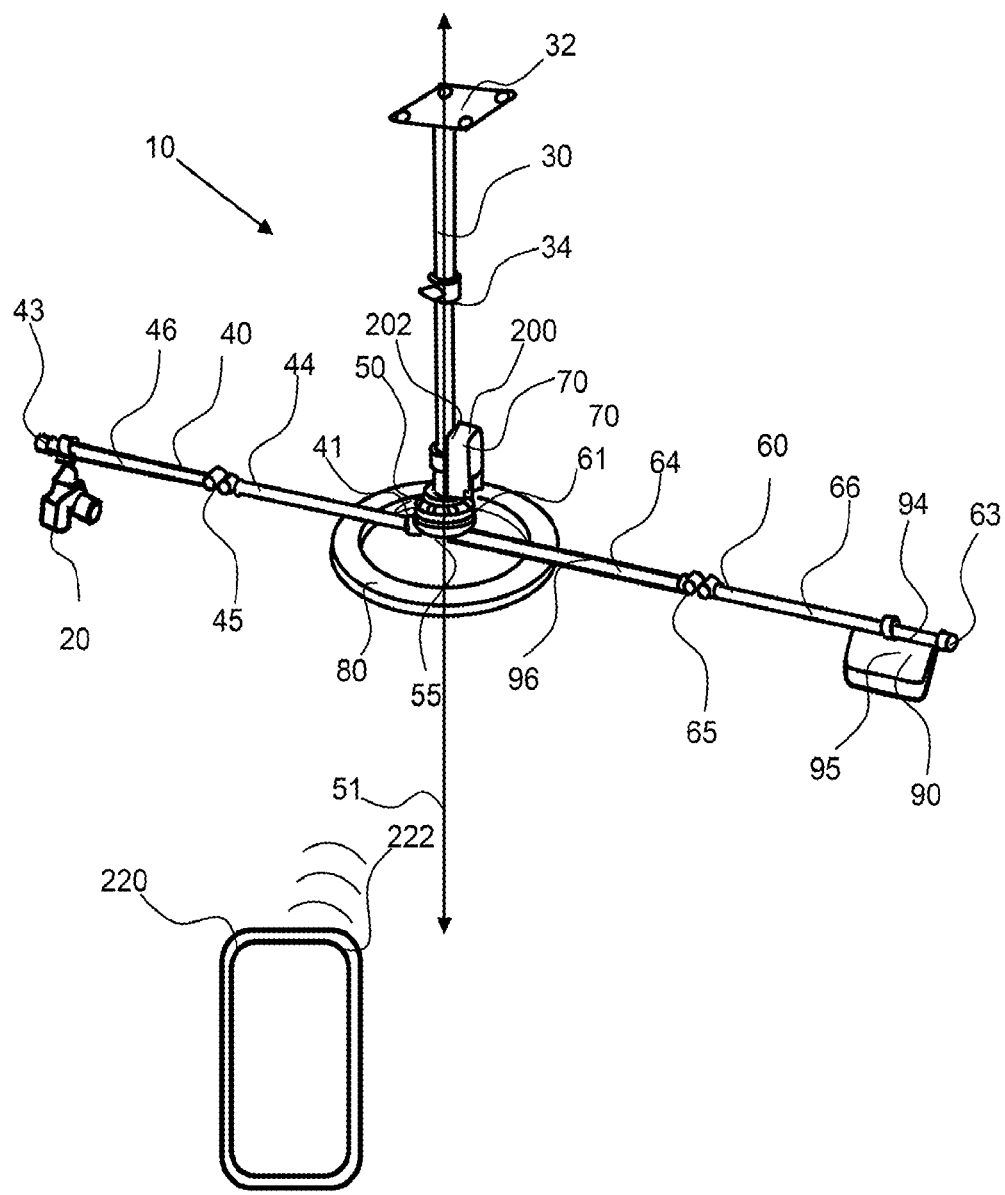
FIG. 1 shows a perspective view of an exemplary orbital camera system having a camera mounted to a first extension and a counterweight, such as a battery mounted to a second extension extending from a hub.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
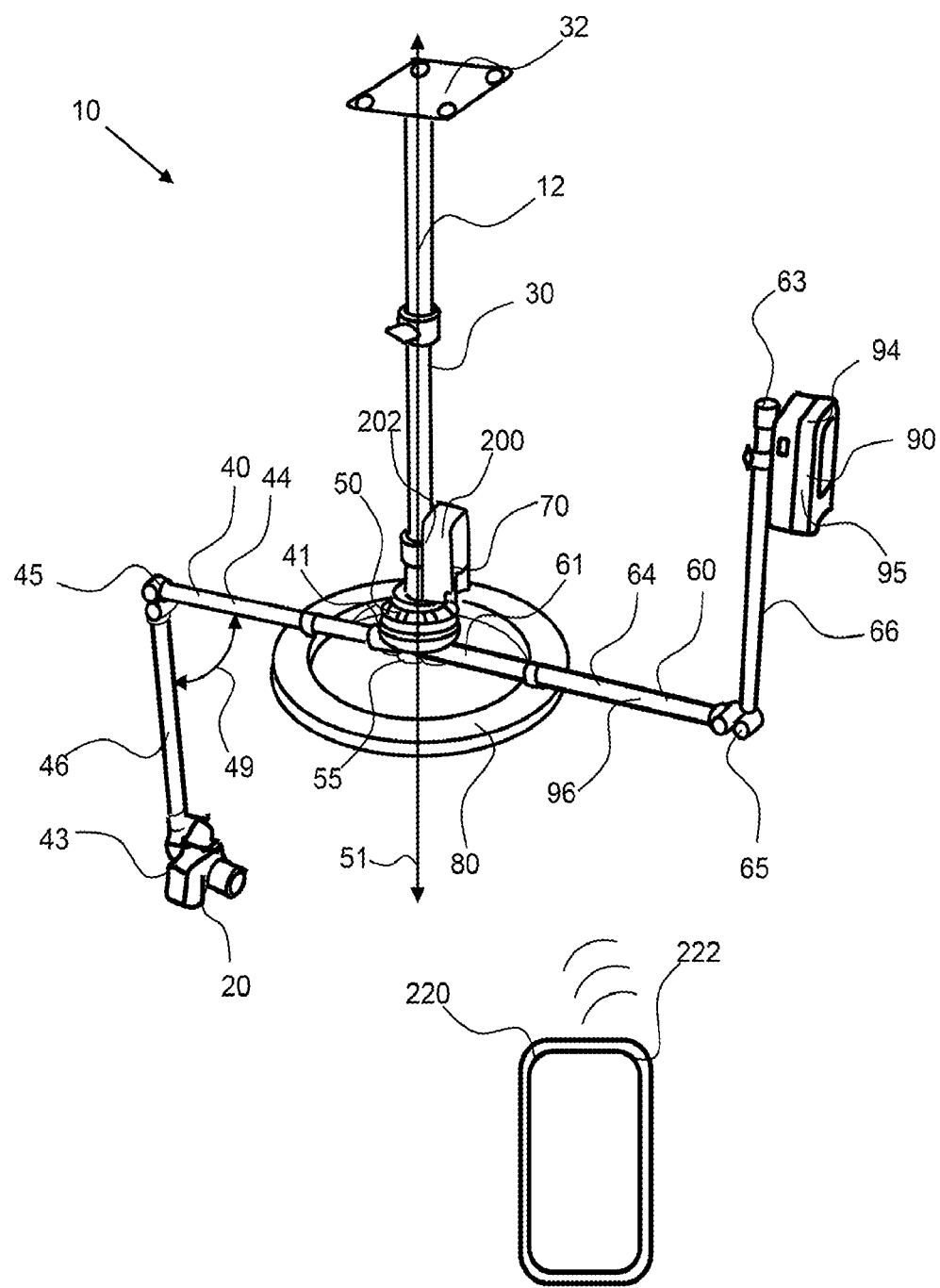
FIG. 2 shows a perspective view of the exemplary orbital camera system shown in FIG. 1, which the first and second extensions rotated about their respective hinges.

Referring now to FIGS. 1 and 2, an exemplary orbital camera system 10 enables rotation of a camera 20 about a rotation axis 51 of a hub 50. The hub is rotated by a motor 70 and an object positioned under the hub along the rotational axis may be imaged, photographed or video recorded via a camera 20 mounted to one or both of the first extension 40 and second extension 60. The camera 20 is mounted proximal to the extended end 43 of the first extension 40 and a counterweight 90, such as a battery 94, is mounted to proximal the extended end 63 of the second extension 60. The battery may be detachably attachable to a battery station 95 that is coupled to the second extension. Battery leads 96 may extend from the battery or battery station to the motor 70, which powers the extensions to spin about the hub. The battery leads may extend within the second extension or along the outside of the second extension. The motor is configured to spin the hub and the first and second extensions coupled thereto. The hub-end 41 of the first extension and the hub-end 61 of the second extensions may be detachably attached to the hub by an extension connector 55. Also, the first extension 40 has a hinge 45 that enables the distal segment 46 of the first extension to rotated with respect to the proximal segment 44, as shown in FIG. 2. Likewise, the second extension 60 has a hinge 65 that enables the distal segment 66 of the second extension to rotated with respect to the proximal segment 64, as shown in FIG. 2. A down rod 30, which may be a telescoping down rod 34, extends from a mount 32, wherein one portion of the down rod extends into another portion of the down rod to enable changing the length of the down rod. An illumination light 80 is coupled to the orbital camera assembly 12 and may be mounted below the first and second extensions to provide lighting without shadows from any of the other assembly components. The illumination light is a ring illumination light extending around the rotation axis 51.

As shown in FIG. 1 and throughout the figures an exemplary orbital camera system 10 may be controlled remotely by a remote controller 220, such as a mobile device or more specifically a mobile phone or tablet computer that operates a program or App to control the motion, sweep angle, speed, and various other functions of the orbital camera system. The remote controller may communicate with a wireless transceiver 202 that is coupled with the controller 200 of the orbital camera system, or more specifically to the motor 70. The remote controller may have a wireless transceiver 222 that includes a wireless signal transmitter to transmit instructions to the controller 200. The wireless signal may be a short-range wireless signal including a Bluetooth signal. As described herein, a remote controller may control various motions of the extensions or rotation produced by the motor. For example, the extensions may be rotated a first sweep angle of 50 degrees at a first speed of 2 rpm and then back a sweep angle of 80 degrees, thereby overlapping the first sweep angle at a second speed of 5 rpm.

As shown in FIG. 2, distal segment 46 of the first extension 40 is rotated down about the hinge 45 and the distal segment 66 of the second extension 60 is rotated up about the hinge 65.

Figure 3:
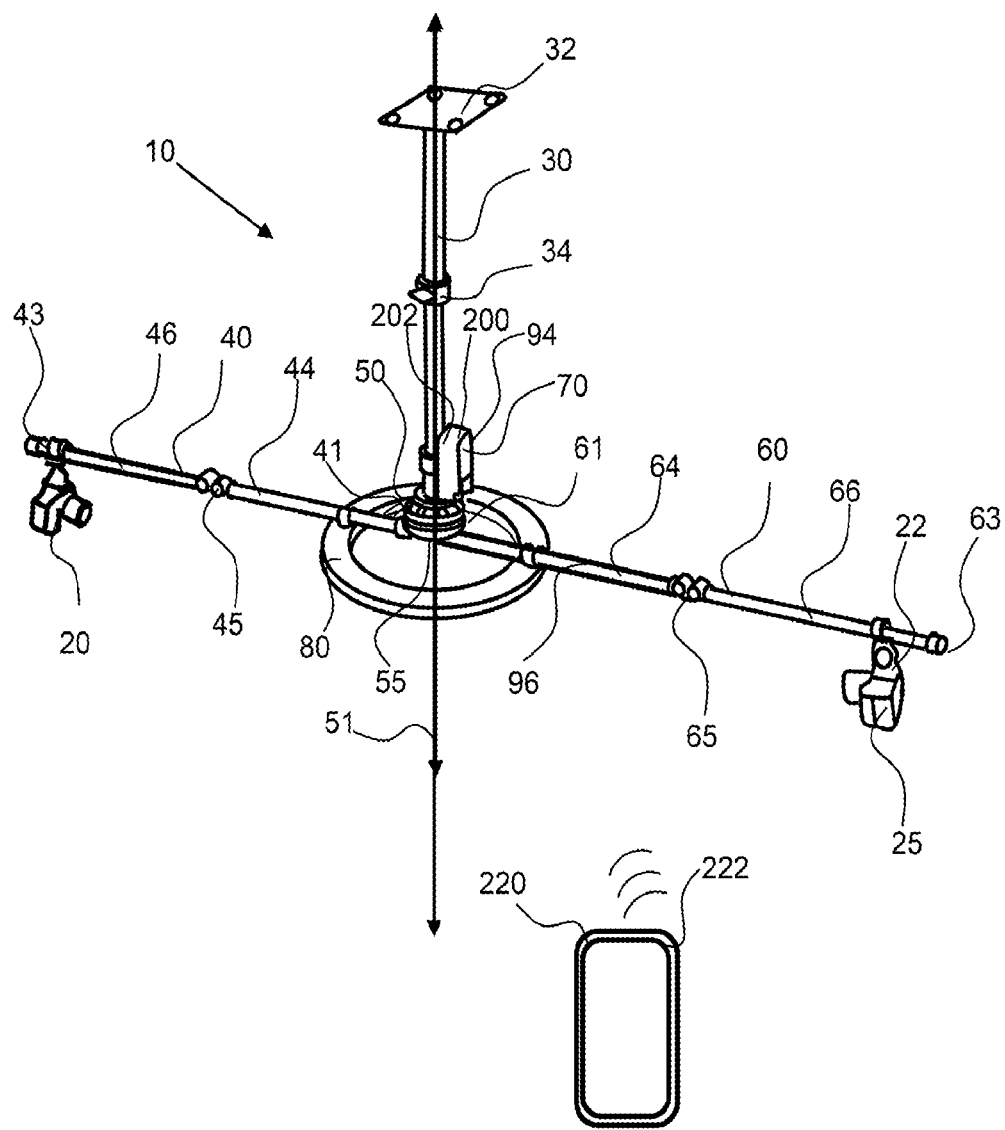
FIG. 3 shows a perspective view of an exemplary orbital camera system having a camera mounted to a first extension and a counterweight, such as a battery mounted to a second extension extending from a hub

As shown in FIG. 3, an exemplary orbital camera system 10 enables rotation of a first camera 20 and a second camera 25 about a hub 50. The first camera 20 is mounted proximal to the extended end 43 of the first extension 40 and a second camera 25, is mounted to proximal the extended end 63 of the second extension 60. A battery 94 may be coupled with the motor 70, that drives the hub to rotate the two extensions. The motor is configured to spin the hub and the first and second extensions coupled thereto. The hub-end 41 of the first extension and the hub-end 61 of the second extensions may be detachably attached to the hub by an extension connector 55. Also, the first extension 40 has a hinge 45 that enables the distal segment 46 of the first extension to rotated with respect to the proximal segment 44. Likewise, the second extension 60 has a hinge 65 that enables the distal segment 66 of the second extension to rotated with respect to the proximal segment 64. A down rod 30, which may be a telescoping down rod 34, extends from a mount 32. An illumination light 80 is coupled to the orbital camera assembly 12 and may be mounted below the first and second extensions to provide lighting without shadows from any of the other assembly components. Note that the second extension may have the same components and features as listed and shown in FIGS. 4 to 6.

As shown in FIG. 4, a first extension 40 is in a straight configuration with the distal segment 46 aligned with the proximal segment 44. The extension extends substantially straight from the hub-end 41 to the extended end 43 and has a length 42.

As shown in FIG. 5, a first extension 40 is in a rotated configuration with the distal segment 46 rotated an extension angle 49 of about 280 degrees about the hinge 45 with respect to the proximal segment 44. The distal segment is orthogonal to the proximal segment. The hinge lock 47 may be manipulated to allow the rotation of the distal segment with respect to the proximal segment and then locked to secure the desired rotational orientation. The lock may be a knob that is turned to loosen and turned an opposing direction to tighten and lock the extension in position.

As shown in FIG. 6, the first extension 40 is in a folded configuration with the distal segment 46 rotated about the hinge 45 to be substantially parallel with the proximal segment 44. The folded length 48 is about half that of the straight length 42 of the first extension, shown in FIG. 3.

Figure 7:
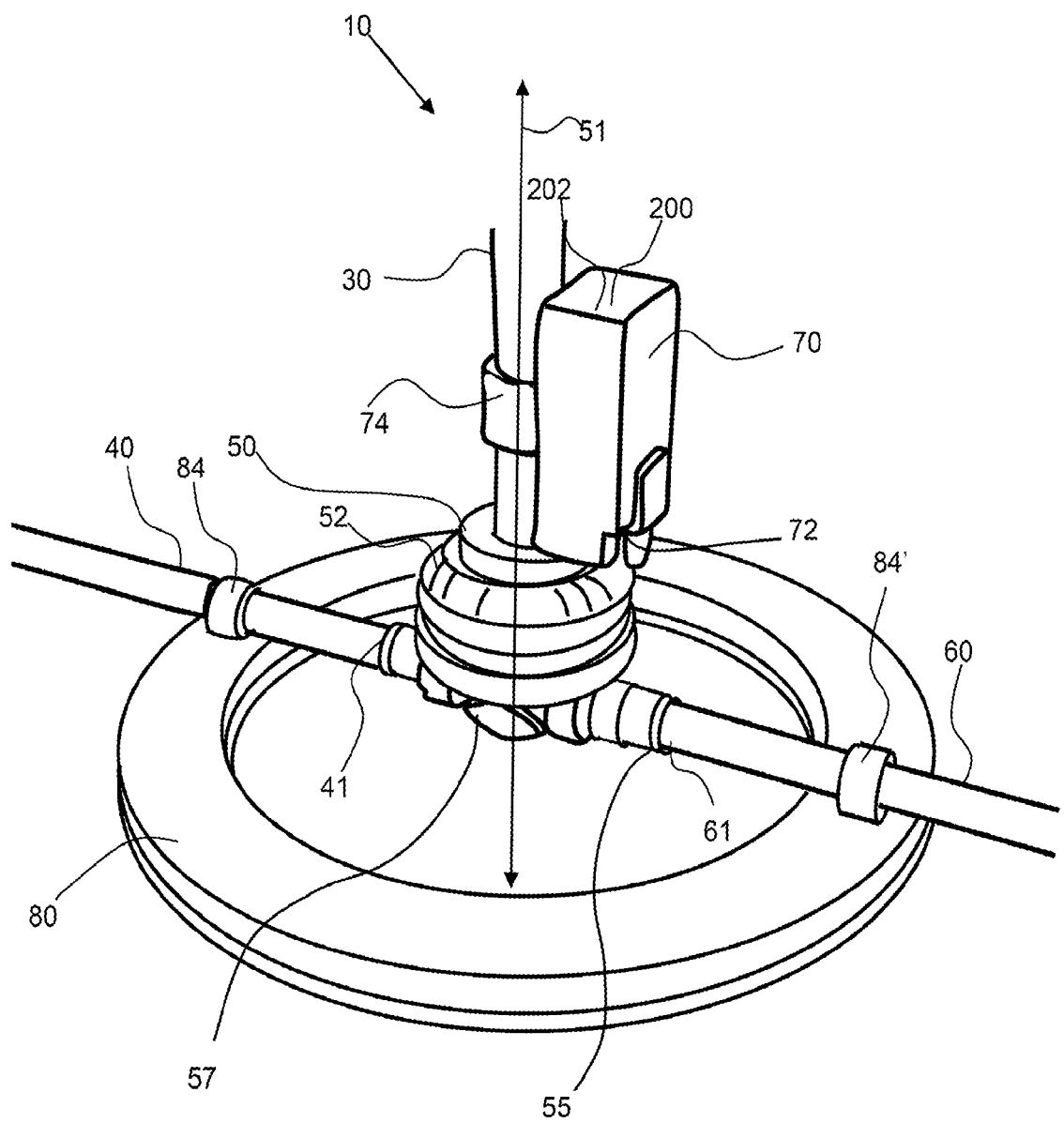
FIG. 7 shows an enlarged view of the hub portion of an exemplary orbital camera system wherein a motor is engaged with a hub-gear by a motor-gear to rotate the hum and the first and second extensions coupled thereto.

As shown in FIG. 7, the hub portion 50 of an exemplary orbital camera system 10 is rotated by a motor 70 that is engaged with a hub-gear 52 by a motor-gear 72. The first extension 40 and second extension 60 are coupled to the hub by an extension connector 55. The hub-end 41 of the first extension 40 and the hub-end 61 of the second extension 60 may be inserted into the extension connector and an extension lock 57, such as a knob, may secure the extensions to the extension connector. The motor may be detachably attachable to the down rod 30 by a motor connector 74. An illumination light is coupled to the extensions by light connectors 84, 84', that extend from the light to the first and second extensions, respectively. The illumination light is battery powered by a light battery 82 to avoid a wired powered connection to the rotating light.

Figure 8:
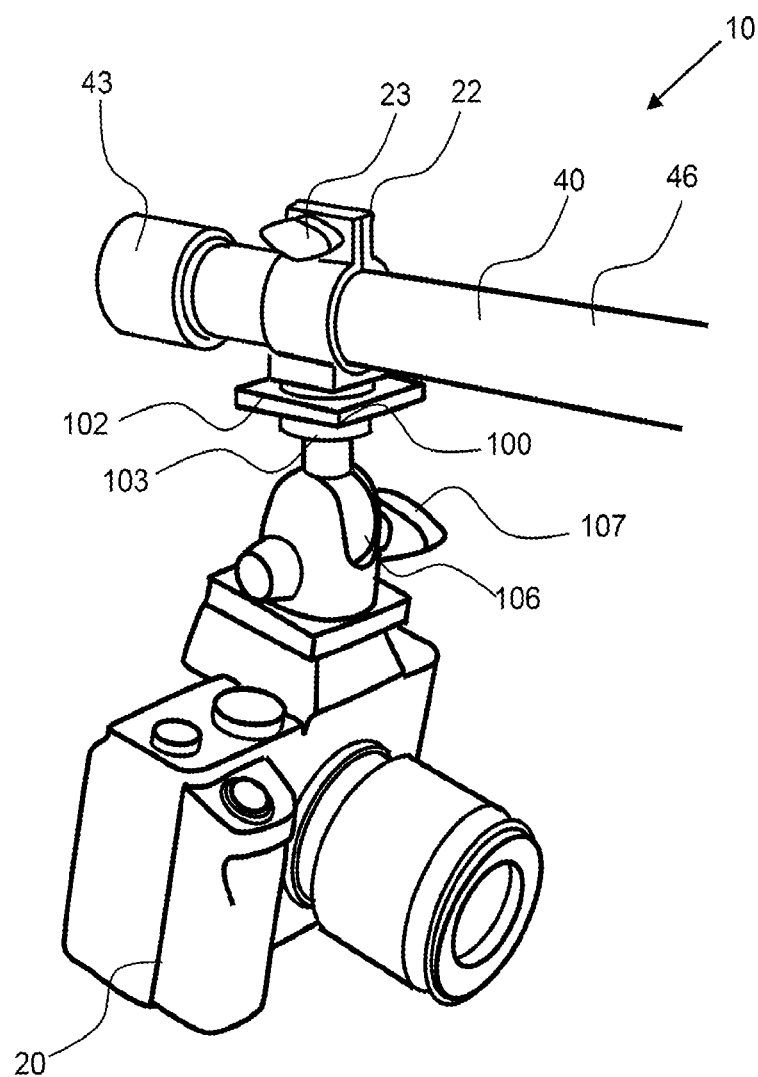
FIG. 8 shows an enlarged view of a camera coupled to the first extension.

As shown in FIG. 8, an exemplary camera 20 is coupled to the first extension 40 by a camera extension coupler 22 having a camera-extension lock 23 to allow the camera to be slid along the first extension and then locked in position with the camera-extension lock 23, such as by turning the knob to tighten the clamp. The camera mount 100 has a horizontal pivot 102 to allow the camera to be rotated horizontally and a horizontal pivot lock 103 to lock the camera in a horizontal position. The camera mount 100 has a vertical pivot 106 to allow the camera to be rotated vertically and a vertical pivot lock 107 to lock the camera in a vertical position.

Figure 9:
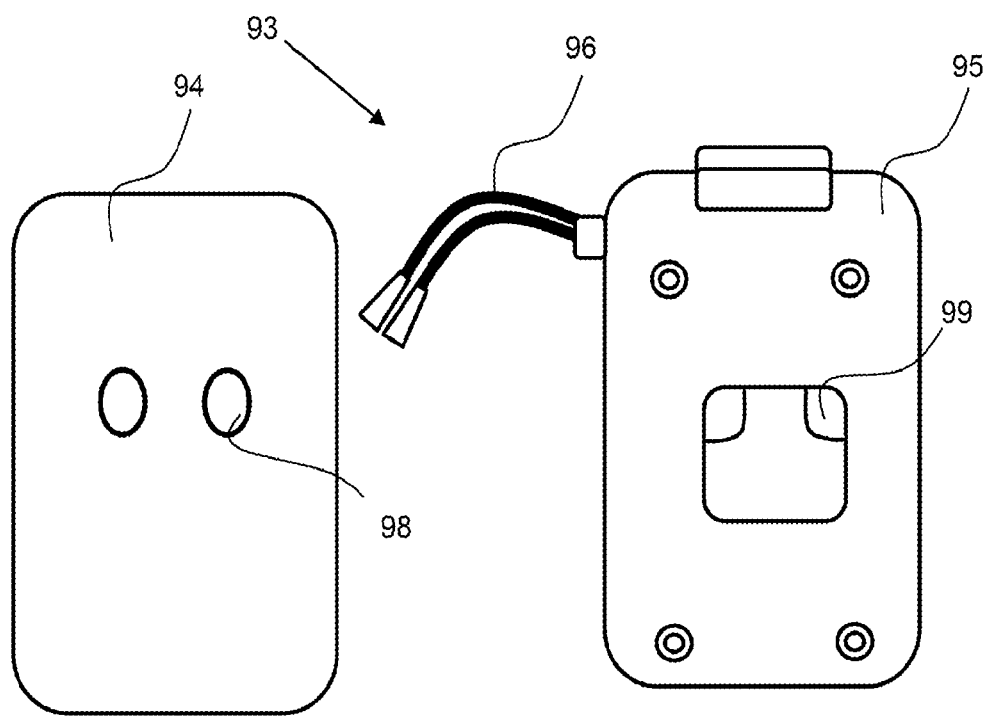
FIG. 9 shows an exemplary battery system having a battery that is detachably attachable to a battery station.

As shown in FIG. 9, an exemplary battery system 93 has a battery 94 that is detachably attachable to a battery station 95. Battery leads 96 extend out from the battery station and may extend along an extension to the motor or to the camera to provide power. A battery below a threshold charge level may be quickly detached and replaced with a charged battery and the leads do not have to be disengaged. The battery station may have station contacts 99 that are configured to make electrical contact with the battery contacts 98. The station contacts may be coupled with the battery leads 96 that extend to the motor, light or camera.

Figure 10:
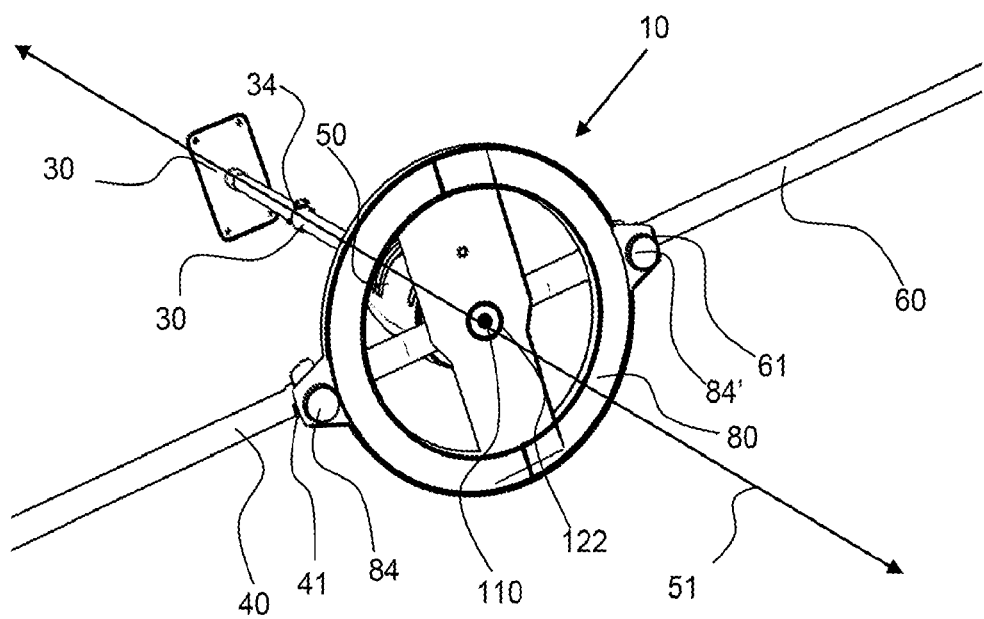
FIG. 10 shows a bottom perspective view of an exemplary orbital camera system having a detachably attachable light coupled to the hub and a focal hub attachment configured around a centering light emitter.

Referring now to FIGS. 10 to 13, an exemplary orbital camera system 10 has a detachably attachable illumination light 80 coupled to the hub 50 and the light is a ring light, having a center aperture, to accommodate a centering light emitter 110 and a focal hub attachment 122. The focal hub attachment 122 extends around the centering light emitter and may be a male or female threaded attachment or any other suitable attachment device, including a ball and detent arrangement. As shown in FIG. 10, the illumination light 80 is detachably attachable by the light connectors 84, 84'.

Figure 11:
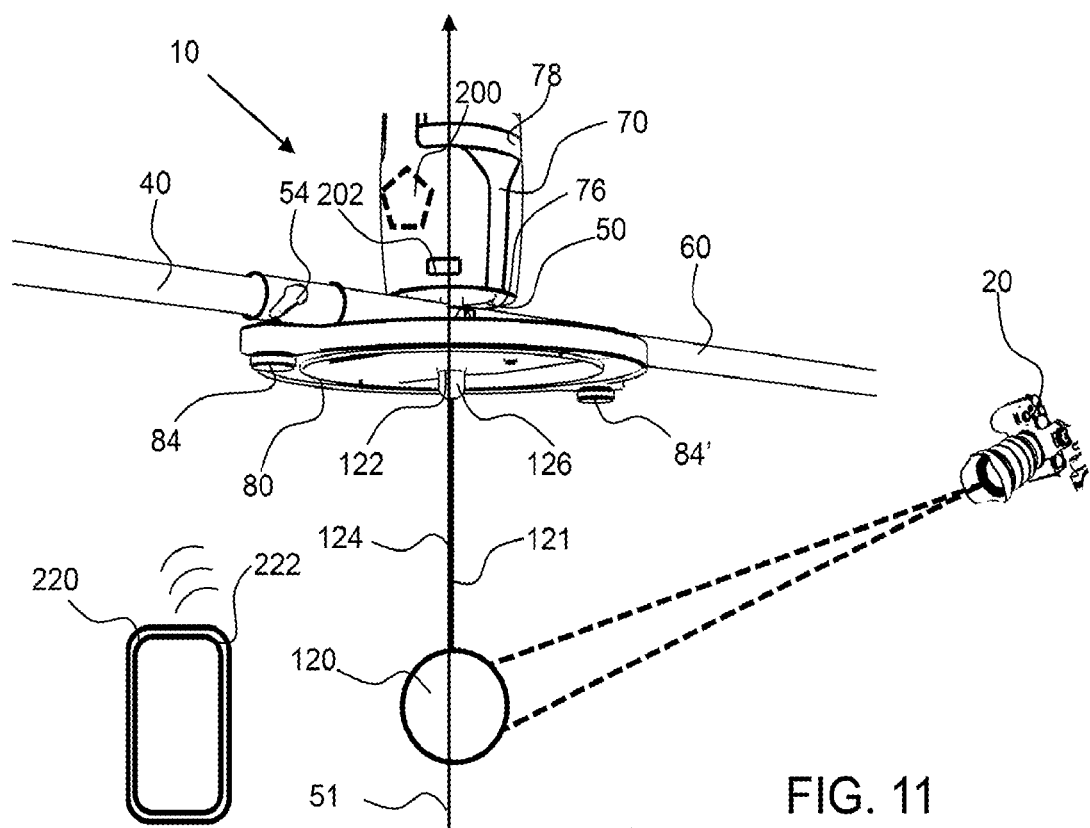
FIG. 11 shows a side perspective view of an exemplary orbital camera system having a focal element hanging from the hub by a focal tether that is coupled by the focal element attachment to the focal hub attachment, and a camera using the focal element to focus the lens.

As shown in FIG. 11, a focal element assembly 121 includes a focal element 120, a sphere, that is hanging from the hub 50 by a focal tether 124 that is coupled by the focal element attachment 126, detachably attached to the focal hub attachment 122. A camera 20 is being focused on the focal element. In a method of imaging an object, the focal element 120 is coupled to the hub and is positioned in a location where an object to be imaged is to be placed. The focal tether may be adjustable in length to allow positioning the focal element vertical along the rotational axis of the hub. A camera is mounted to one of the first or second extensions, in a fixed position. The camera is then focused on the focal element.

The motor 70 in FIGS. 10 to 17 may be a direct drive motor that directly drives the hub without any external gearing and the motor may be a servo motor that that effectively rotates at very low speeds such as less than 5 RPM, or even less than 1 RPM. Also, a servo motor may be quiet to avoid any background noise during video recording using the system. Also, a servo motor may more effectively enable programming of the speed and or motion trajectories, such as a first sweep angle at a first speed and a second sweep angle at a second speed.

Figure 12:
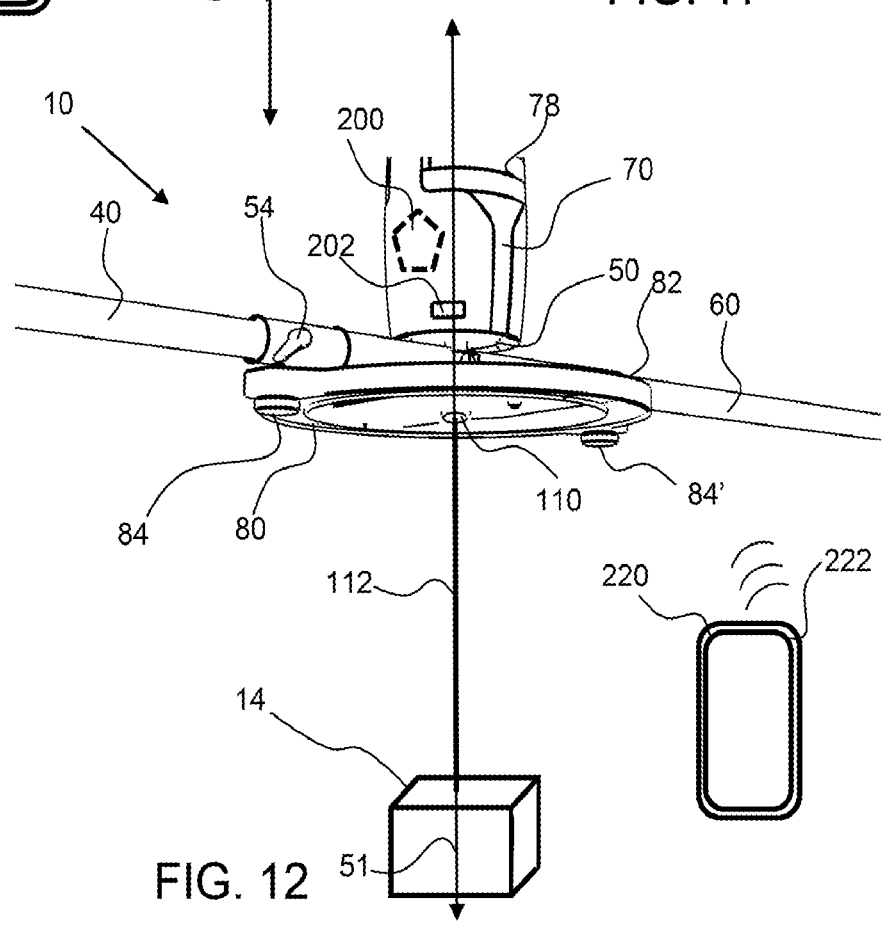
FIG. 12 shows a side perspective view of an exemplary orbital camera system having a centering light emitter projecting a light down for centering the object under the hub.
Figure 13:
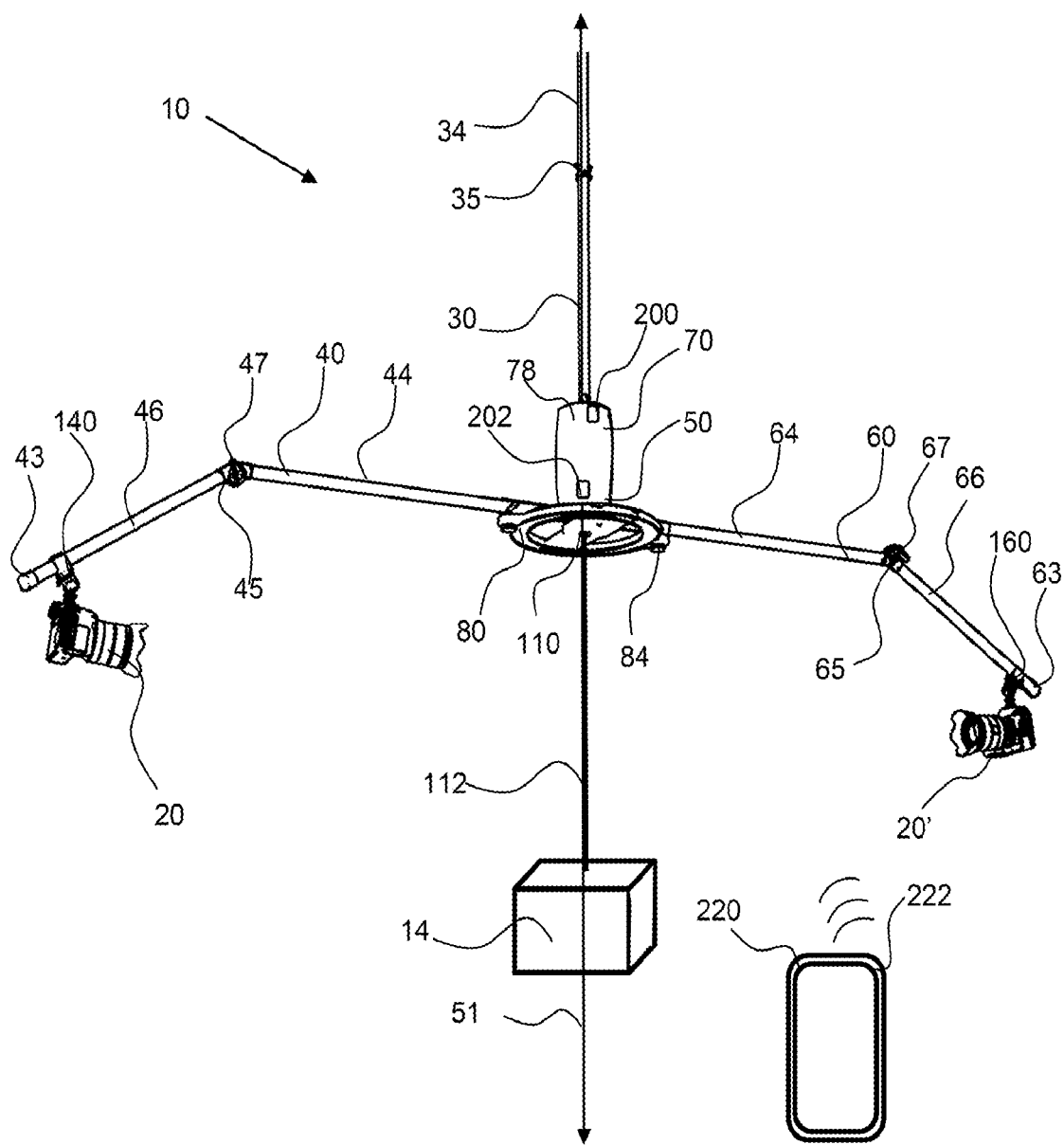
FIG. 13 shows a side perspective view of an exemplary orbital camera system with two cameras, wherein a first camera is coupled to the first extension and a second camera is coupled to the second extension.

As shown in FIG. 12, and FIG. 13, a light 112 is being emitted by the centering light emitter 110 onto an object 14. The centering light may be used to ensure an object is centered to ensure in focus imaging prior to starting filming or photography of the object. As shown in FIG. 13, a first camera 20 is coupled to the first extension 40 and a second camera 20' is coupled to the second extension 60.

Figure 14:
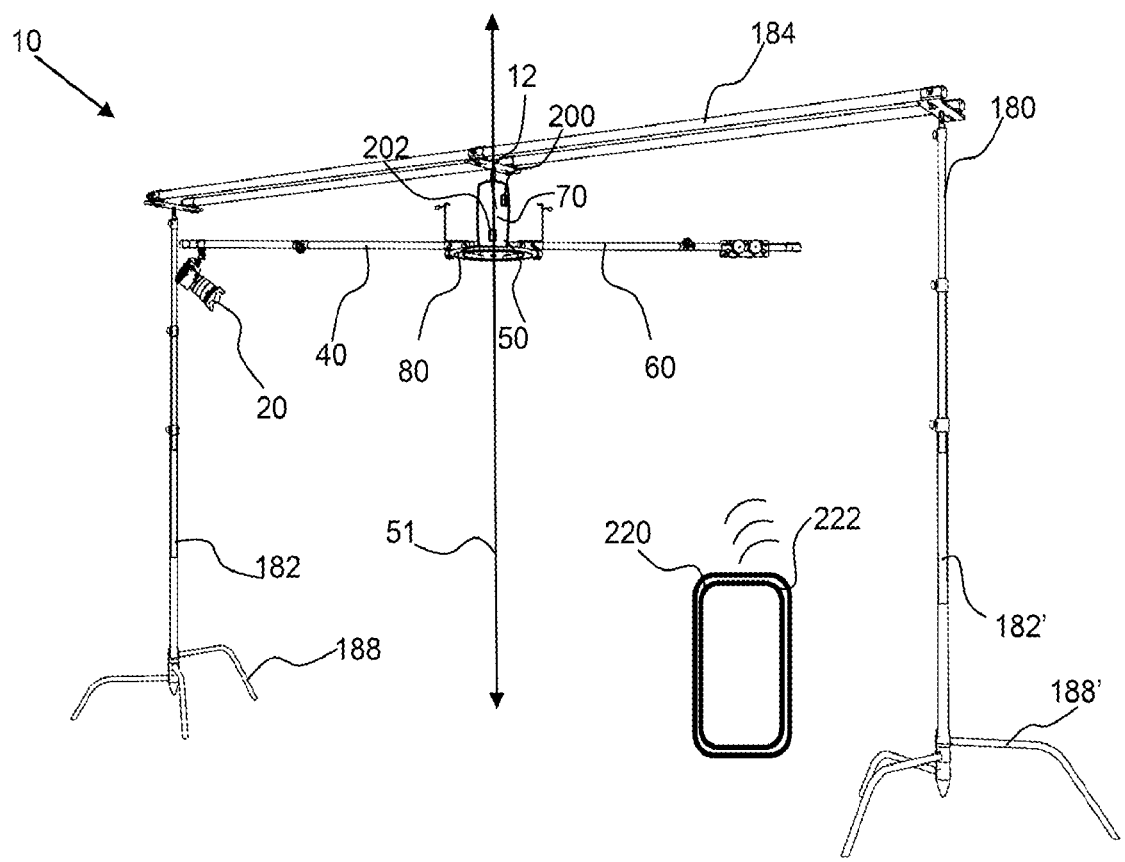
FIG. 14 shows a side perspective view of an exemplary orbital camera system that includes a mount stand having a stand extension between two vertical stands and the orbital camera assembly coupled to the stand extension.
Figure 15:
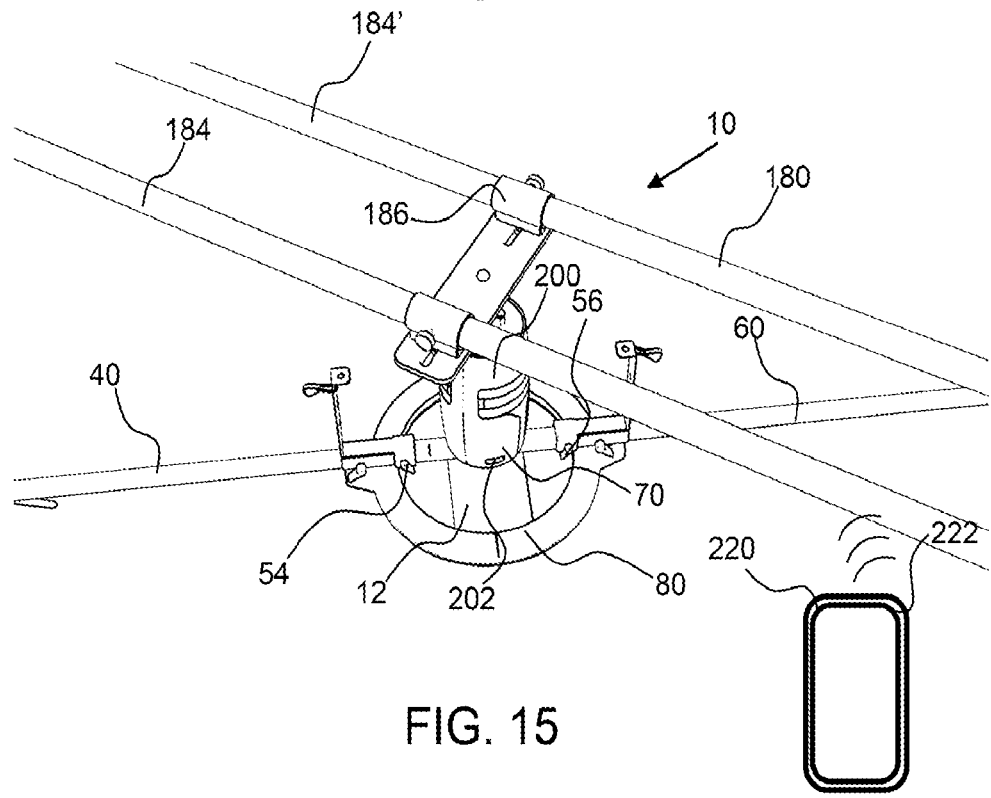
FIG. 15 shows a top perspective view of an exemplary orbital camera assembly coupled to the stand extension of a mount stand.

Referring now to FIGS. 14 and 15, an exemplary orbital camera system 10 includes a mount stand 180 having a stand extension 184 between two vertical stands 182, 182' and the orbital camera assembly 12 coupled to the stand extension by a mount stand coupler 186. As shown, there are two stand extensions 184, 184' that may provide for more stability of the orbital camera assembly. Also, the vertical stands are configured on stand bases 188, 188' that rest on a ground surface to secure the vertical stands upright. Note that the stand base and length of the vertical stands may be adjusted for uneven ground surfaces or for a slope between a first vertical stand 182 and a second vertical stand 182'. As shown in FIG. 15, the mount stand coupler may enable the orbital camera assembly 12 to slide along the stand extensions 184, 184'.

Figure 16:
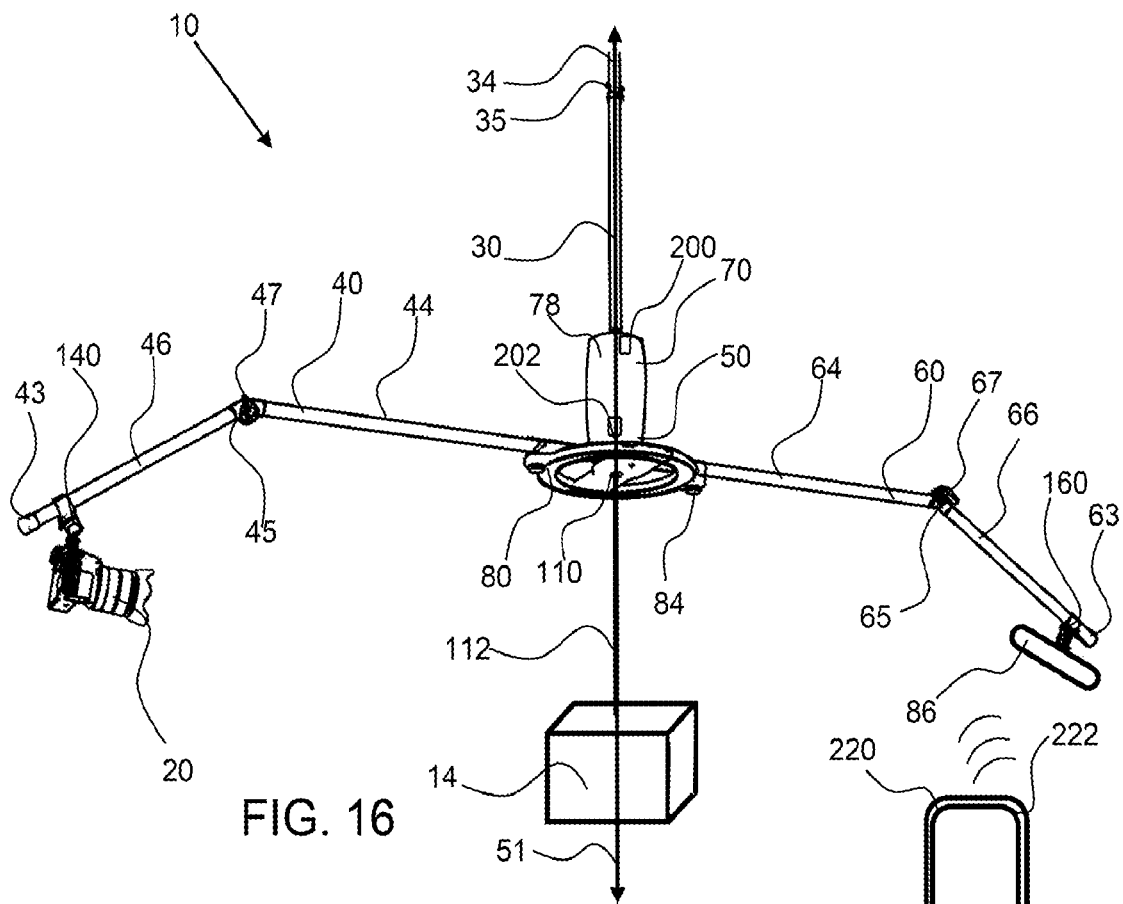
FIG. 16 shows a side perspective view of an exemplary orbital camera system having a camera coupled to the first extension and an extension light coupled to the second extension.

As shown in FIG. 16, an exemplary orbital camera system 10 has a camera 20 coupled to the first extension 40 via a first extension attachment 140 and an extension light 86 coupled to the second extension 60 via a second extension attachment 160. In this embodiment, the first extension attachment 140 may be a camera mount 100 as shown in FIG. 8. The second extension attachment may be a clip for attachment of the extension light.

Figure 17:
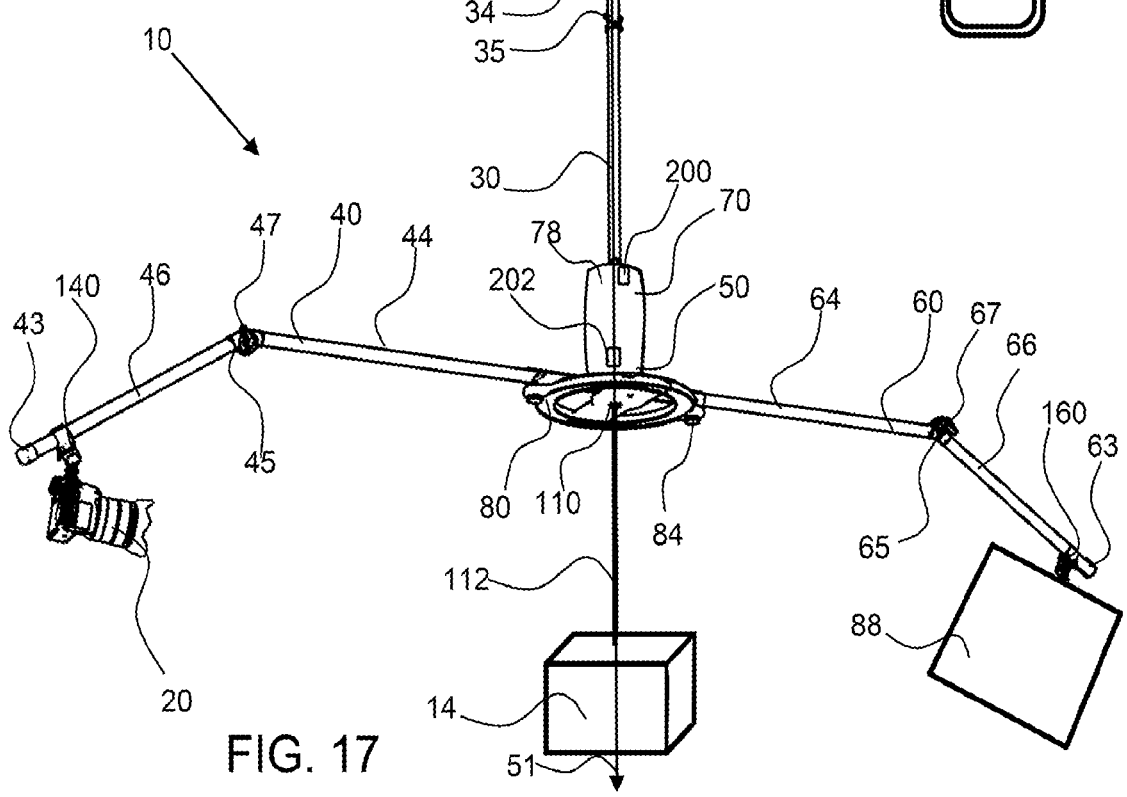
FIG. 17 shows a side perspective view of an exemplary orbital camera system having a camera coupled to the first extension and a back-panel coupled to the second extension.

As shown in FIG. 17 an exemplary orbital camera system 10 has a camera 20 coupled to the first extension 40 via a first extension attachment 140 and a back-panel 88 coupled to the second extension 60 via a second extension attachment 160. The back panel may be a green-screen panel to enable animation in the background of the object to be added or overlayed effectively.

As shown in FIGS. 10 to 17, the motor is a direct drive motor with the hub attached to the drive shaft 76 of the motor, as shown in FIG. 11. The drive shaft forms the down rod or a portion of the down rod in this configuration. The motor has a battery 78 that enables the motor to operate without any wired power connection, thereby making the motor a portable motor. The battery may be a rechargeable battery. The motor may be a servo motor that can rotate as very low speeds with very little noise and low vibration.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. An orbital camera system comprising:
a) a down rod,
b) a hub coupled to the down rod;
c) a motor configured to rotate said hub about a rotation axis;
d) a first extension coupled to and extending from the hub in a first direction and comprising:
i) a proximal segment of the first extension;
ii) a distal segment of the first extension;
iii) a hinge of the first extension configured between the proximal segment of the first extension and distal segment of the first extension to enable the distal segment of the first extension to rotate with respect to the proximal segment of the first extension;
e) a second extension coupled to and extending from the hub in a second direction opposite said first direction and comprising:
i) a proximal segment of the second extension;
ii) a distal segment of the second extension;
iii) a hinge of the second extension configured between the proximal segment of the second extension and distal segment of the second extension to enable the distal segment of the second extension to rotate with respect to the proximal segment of the second extension;
f) an illumination light coupled to the hub;
g) a camera coupled to the first extension,
wherein the illumination light is a ring light extending around the rotation axis.

2. The orbital camera system of claim 1, further comprising a focal element assembly comprising a focal element coupled to a focal tether and a focal element attachment configured on an extended end of the focal tether, wherein the hub comprises a focal hub attachment for detachable attachment of the focal element assembly via the focal element attachment.

3. The orbital camera system of claim 2, wherein the focal hub attachment is configured around the rotation axis.

4. The orbital camera system of claim 3, further comprising a centering light emitter configured to emit a centering light along the rotation axis, and configured within the focal hub attachment.

5. The orbital camera system of claim 4, wherein the centering light is a laser light and wherein the centering light emitter is a laser.

6. The orbital camera system of claim 1, further comprising a centering light emitter configured to emit a centering light along the rotation axis, and configured within the focal hub attachment.

7. The orbital camera system of claim 6, wherein the centering light is a laser light and wherein the centering light emitter is a laser.

8. The orbital camera system of claim 1, wherein the illumination light comprises a light battery and is a battery powered light.

9. The orbital camera system of claim 1, further comprising a second extension attachment and an extension light attached to the second extension attachment.

10. The orbital camera system of claim 1, further comprising a second extension attachment and a back-panel attached to the second extension attachment.

11. The orbital camera system of claim 1, further comprising a second extension attachment and a second camera attached to the second extension attachment.

12. The orbital camera system of claim 1, wherein the hub is directly coupled to the motor and the motor is a direct drive motor and the down rod comprises a drive shaft of the motor.

13. The orbital camera system of claim 1, further comprising a controller and a wireless transceiver that receives a wireless programed motion instruction signal from a remote controller, wherein the programed motion instructions including a direction and speed of rotation.

14. The orbital camera system of claim 1, further comprising a counterweight coupled to the second extension, wherein counterweight is configured along the second extension to balance the first and second extensions about the hub.

15. The orbital camera system of claim 14, wherein the down rod is slidably engaged with the stand extension.

16. The orbital camera system of claim 1, wherein the hinge of the first extension has a hinge lock to lock the distal segment in a rotated position with respect to the proximal segment of the first extension.

17. The orbital camera system of claim 1, wherein the distal end of the first extension can be rotated about the hinge to a folded configuration.

18. The orbital camera system of claim 1, wherein the camera is coupled to the first extension by a camera mount having a horizontal and a vertical pivot.

19. The orbital camera system of claim 18, wherein the camera is slidably coupled with the first extension, whereby the camera can be slid along the first extension.

20. The orbital camera system of claim 19, wherein the camera is detachably attached to the first extension by a camera-extension coupler; wherein the camera-extension coupler comprises a camera-extension lock to secure the camera-extension coupler in a position along the first extension.

21. The orbital camera system of claim 1, wherein the counterweight comprises a battery.

22. The orbital camera system of claim 1, further comprising a mount stand comprising:
a) two vertical stands
b) a stand extension extending between the two vertical stands;
wherein the down rod is coupled to the stand extension by a mount stand coupler.

23. An orbital camera system comprising:
a) a down rod,
b) a hub coupled to the down rod;
c) a motor configured to rotate said hub about a rotation axis;
d) a first extension coupled to and extending from the hub in a first direction and comprising:
  i) a proximal segment of the first extension;
  ii) a distal segment of the first extension;
  iii) a hinge of the first extension configured between the proximal segment of the first extension and distal segment of the first extension to enable the distal segment of the first extension to rotate with respect to the proximal segment of the first extension;
e) a second extension coupled to and extending from the hub in a second direction opposite said first direction and comprising:
  i) a proximal segment of the second extension;
  ii) a distal segment of the second extension;
  iii) a hinge of the second extension configured between the proximal segment of the second extension and distal segment of the second extension to enable the distal segment of the second extension to rotate with respect to the proximal segment of the second extension;
f) an illumination light coupled to the hub;
g) a camera coupled to the first extension,
further comprising an extension coupler and wherein the illumination light is coupled to and below the extension coupler;
wherein the illumination light is below the hub, the extension coupler and the first and second extensions.

* * * * *